United States Patent
Haag et al.

(10) Patent No.: US 10,461,383 B2
(45) Date of Patent: Oct. 29, 2019

(54) BATTERY ENCLOSURE HAVING A COMPOSITE STRUCTURE WITH A COOLANT CHANNEL

(71) Applicant: Ford Global Technologies, LLC, Dearborn, MI (US)

(72) Inventors: Jeffrey Matthew Haag, Dearborn, MI (US); Lucas Amber, Dearborn, MI (US); Jason Sielaff, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 15/670,322

(22) Filed: Aug. 7, 2017

(65) Prior Publication Data

US 2019/0044203 A1     Feb. 7, 2019

(51) Int. Cl.
*H01M 10/6556* (2014.01)
*H01M 10/613* (2014.01)
*H01M 10/625* (2014.01)
*H01M 10/6554* (2014.01)
*H01M 2/10* (2006.01)

(52) U.S. Cl.
CPC ..... *H01M 10/6556* (2015.04); *H01M 2/1077* (2013.01); *H01M 10/613* (2015.04); *H01M 10/625* (2015.04); *H01M 10/6554* (2015.04); H01M 2220/20 (2013.01)

(58) Field of Classification Search
CPC .. H01M 10/60; H01M 10/613; H01M 10/617; H01M 10/655; H01M 10/6552; H01M 10/6554; H01M 10/6556; H01M 10/6567; H01M 10/6568
See application file for complete search history.

(56) References Cited

U.S. PATENT DOCUMENTS

| | | | |
|---|---|---|---|
| 4,976,490 A | | 12/1990 | Gentle |
| 5,158,841 A | * | 10/1992 | Mennicke ......... H01M 10/3909 220/592.2 |
| 5,620,057 A | * | 4/1997 | Klemen ................... B60K 1/04 180/65.1 |
| 7,913,788 B1 | | 3/2011 | Bryer et al. |
| 8,393,427 B2 | | 3/2013 | Rawlinson |
| 9,337,457 B2 | * | 5/2016 | Yajima ................ H01M 2/1077 |

(Continued)

FOREIGN PATENT DOCUMENTS

| DE | 102012015919 | 2/2011 |
|---|---|---|
| JP | 2010527113 | 8/2010 |

OTHER PUBLICATIONS

U.S. Appl. No. 15/340,941, filed Nov. 1, 2016.
2001 EV Workshop manual (See pp. 414-03A-3 and 414-03A-94).

*Primary Examiner* — Carlos Barcena
(74) *Attorney, Agent, or Firm* — Carlson, Gaskey & Olds, P.C.

(57) ABSTRACT

An exemplary battery assembly includes, among other things, a composite structure of an enclosure. The composite structure provides at least a portion of a coolant channel that carries a coolant. An exemplary battery cooling method includes, among other things, exchanging thermal energy between a coolant and a battery component as the coolant is communicated through a coolant channel. The coolant channel is at least partially established by a composite structure of an enclosure.

20 Claims, 3 Drawing Sheets

(56) References Cited

U.S. PATENT DOCUMENTS

| | | | | |
|---|---|---|---|---|
| 2008/0318119 | A1* | 12/2008 | Watanabe | H01M 2/1016 |
| | | | | 429/99 |
| 2009/0142628 | A1* | 6/2009 | Okada | H01M 2/0237 |
| | | | | 429/8 |
| 2009/0246606 | A1* | 10/2009 | Shimizu | H01M 10/625 |
| | | | | 429/62 |
| 2010/0112424 | A1* | 5/2010 | Hayashi | H01M 2/1077 |
| | | | | 429/99 |
| 2010/0236854 | A1* | 9/2010 | Nakamura | B60K 1/04 |
| | | | | 180/68.5 |
| 2012/0103714 | A1 | 5/2012 | Choi et al. | |
| 2017/0047624 | A1* | 2/2017 | Gunna | H01M 10/6556 |
| 2018/0048039 | A1* | 2/2018 | Newman | H01M 10/6556 |

\* cited by examiner

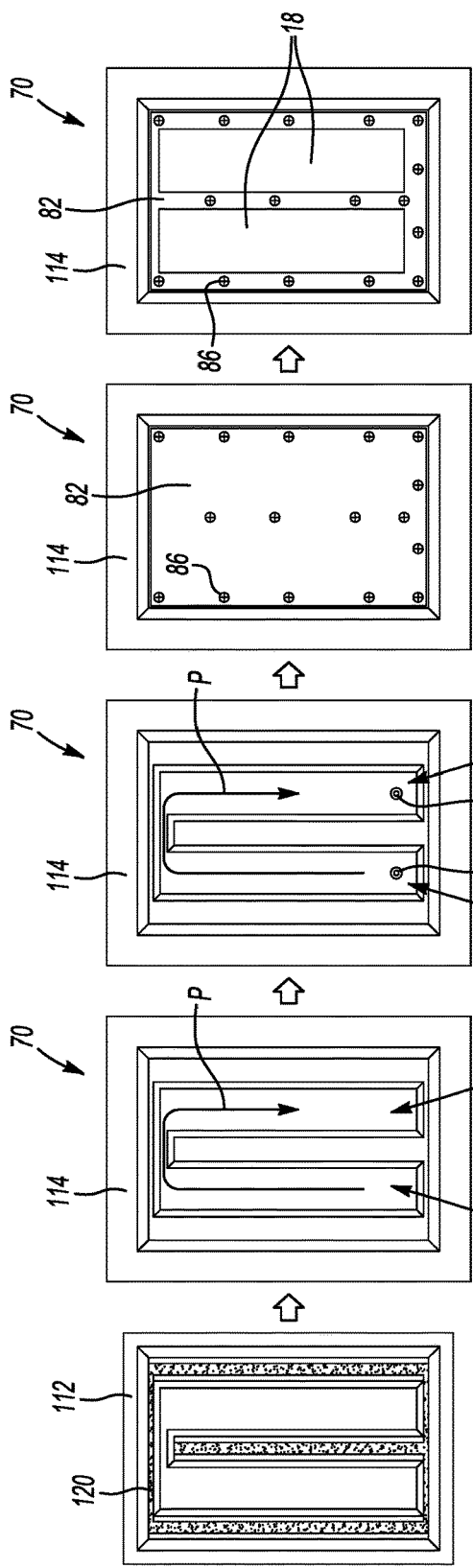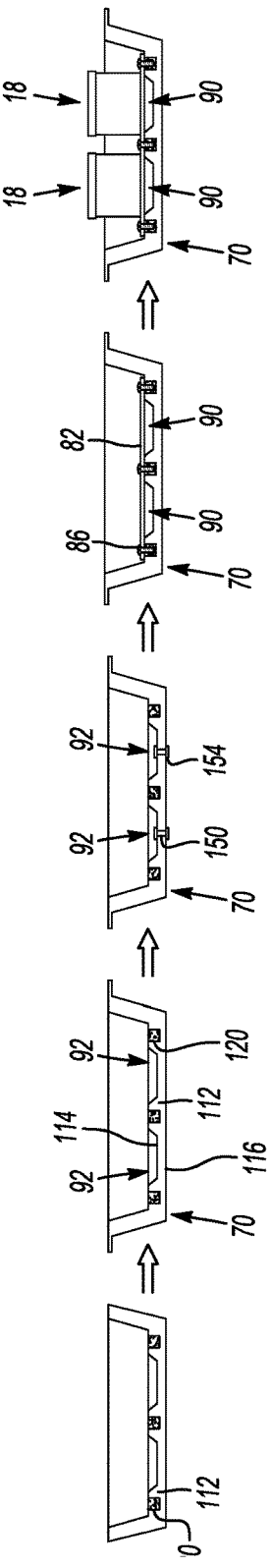

BATTERY ENCLOSURE HAVING A COMPOSITE STRUCTURE WITH A COOLANT CHANNEL

TECHNICAL FIELD

This disclosure is directed toward a battery enclosure and, more particularly, to a composite structure of the enclosure. The composite structure provides at least a portion of a coolant channel.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The battery pack is a relatively high-voltage traction battery that selectively powers the electric machines and other electrical loads of the electrified vehicle. The battery pack can require cooling or heating. The battery pack includes arrays of interconnected battery cells that store energy for powering the electrical loads. The arrays are typically housed within an enclosure.

SUMMARY

A battery assembly according to an exemplary aspect of the present disclosure includes, among other things, a composite structure of an enclosure. The composite structure provides at least a portion of a coolant channel that carries a coolant.

A further non-limiting embodiment of the foregoing assembly includes a thermal exchange plate providing another portion of the coolant channel.

In a further non-limiting embodiment of any of the foregoing assemblies, at a cross-section through the coolant channel, the thermal exchange plate and the composite structure together provide an entire perimeter of the coolant channel.

A further non-limiting embodiment of any of the foregoing assemblies includes an insert held within a core of the composite structure. The insert is configured to receive a fastener that secures a battery component relative to the composite structure.

In a further non-limiting embodiment of any of the foregoing assemblies, the insert extends longitudinally along at least one side of the coolant channel.

In a further non-limiting embodiment of any of the foregoing assemblies, the composite structure includes a core sandwiched between a first outer layer and a second outer layer. The first and second outer layers have a material composition different than a material composition of the core.

In a further non-limiting embodiment of any of the foregoing assemblies, the core is a foam.

In a further non-limiting embodiment of any of the foregoing assemblies, the first outer layer and the second outer layer are a fiber reinforced plastic.

In a further non-limiting embodiment of any of the foregoing assemblies, the first outer layer directly contacts a liquid coolant within the coolant channel.

A further non-limiting embodiment of any of the foregoing assemblies includes at least one support surface and at least one channel surface of the composite structure. The at least one support surface directly contacts a battery component. The at least one channel surface is recessed relative to the at least one support surface to provide a recessed area for the coolant channel.

In a further non-limiting embodiment of any of the foregoing assemblies, the composite structure is a tray of the enclosure.

A battery cooling method according to an exemplary aspect of the present disclosure includes, among other things, exchanging thermal energy between a coolant and a battery component as the coolant is communicated through a coolant channel. The coolant channel is at least partially established by a composite structure of an enclosure.

In a further non-limiting embodiment of the foregoing method, the battery component is a thermal exchange plate.

A further non-limiting embodiment of any of the foregoing methods includes supporting at least one battery array upon the thermal exchange plate.

A further non-limiting embodiment of any of the foregoing methods includes supporting the battery component on at least one support surface of the composite structure The coolant channel is recessed from the at least one support surface.

A further non-limiting embodiment of any of the foregoing methods includes securing the battery component relative to the composite structure by engaging a fastener with an insert held within a core of the composite structure.

In a further non-limiting embodiment of any of the foregoing methods, the composite structure includes a core sandwiched between a first outer layer and a second outer layer.

A further non-limiting embodiment of any of the foregoing methods includes sandwiching a core between a first outer layer and a second outer layer to provide the composition enclosure. The first and second outer layers have a material composition different than a material composition of the core.

A further non-limiting embodiment of any of the foregoing methods includes sandwiching the core between the first and second outer layers using a vacuum bagging process.

In a further non-limiting embodiment of any of the foregoing methods, the core is a foam.

BRIEF DESCRIPTION OF THE FIGURES

The various features and advantages of the disclosed examples will become apparent to those skilled in the art from the detailed description. The figures that accompany the detailed description can be briefly described as follows:

FIG. 5A illustrates a top view of selected portions of the battery pack at a stage of assembly.

FIG. 5B illustrates a top view of selected portions of the battery pack at a stage of assembly later than the stage shown in FIG. 5A.

FIG. 5C illustrates a top view of selected portions of the battery pack at a stage of assembly later than the stage shown in FIG. 5B.

FIG. 5D illustrates a top view of selected portions of the battery pack at a stage of assembly later than the stage shown in FIG. 5C.

FIG. 5E illustrates a top view of selected portions of the battery pack at a stage of assembly later than the stage shown in FIG. 5D.

FIG. 6A illustrates a section view through the selected portions of the battery pack shown in FIG. 5A.

FIG. 6B illustrates a section view through the selected portions of the battery pack shown in FIG. 5B.

FIG. 6C illustrates a section view through the selected portions of the battery pack shown in FIG. 5C.

FIG. 6D illustrates a section view through the selected portions of the battery pack shown in FIG. 5D.

FIG. 6E illustrates a section view through the selected portions of the battery pack shown in FIG. 5E.

DETAILED DESCRIPTION

This disclosure relates generally to an enclosure for a battery pack. The enclosure houses battery arrays.

A composite structure provides at least some of the enclosure. The composite structure can reduce an overall weight of the enclosure relative to an enclosure that does not include a composite structure.

In an exemplary embodiment, the composite structure includes a core sandwiched between layers. The material composition of the core is different than the material composition of the layers. The composite structure provides some portion of coolant channels that are utilized to communicate a coolant through a portion of the battery pack.

Figure 1:
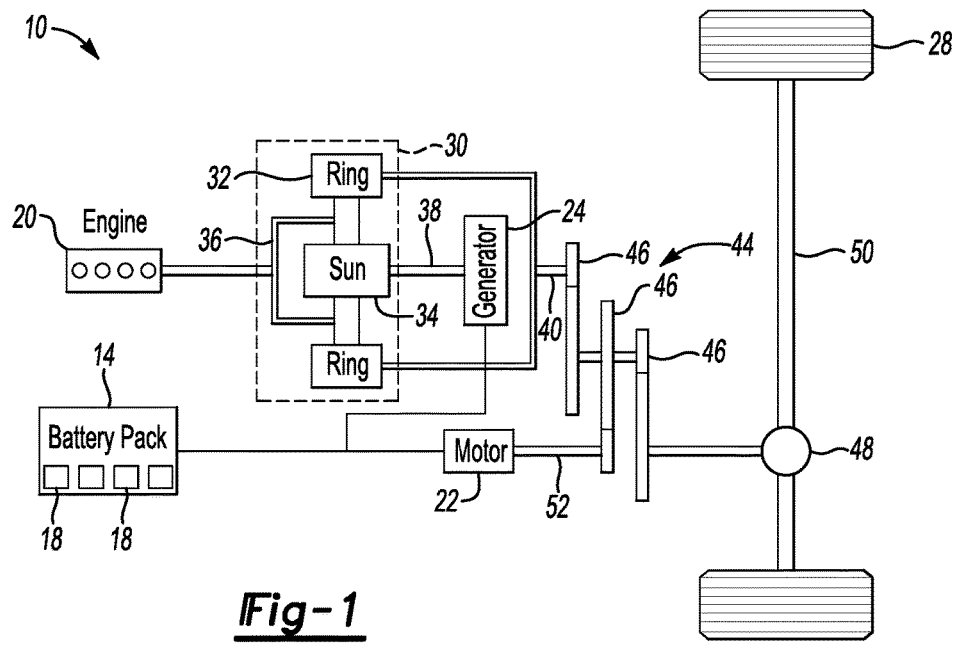
FIG. 1 schematically illustrates an example powertrain for an electrified vehicle.

Referring to FIG. 1, a hybrid electric vehicle (HEV) is a type of an electrified vehicle that can include a powertrain 10. Although depicted as being used in connection with the powertrain 10, it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
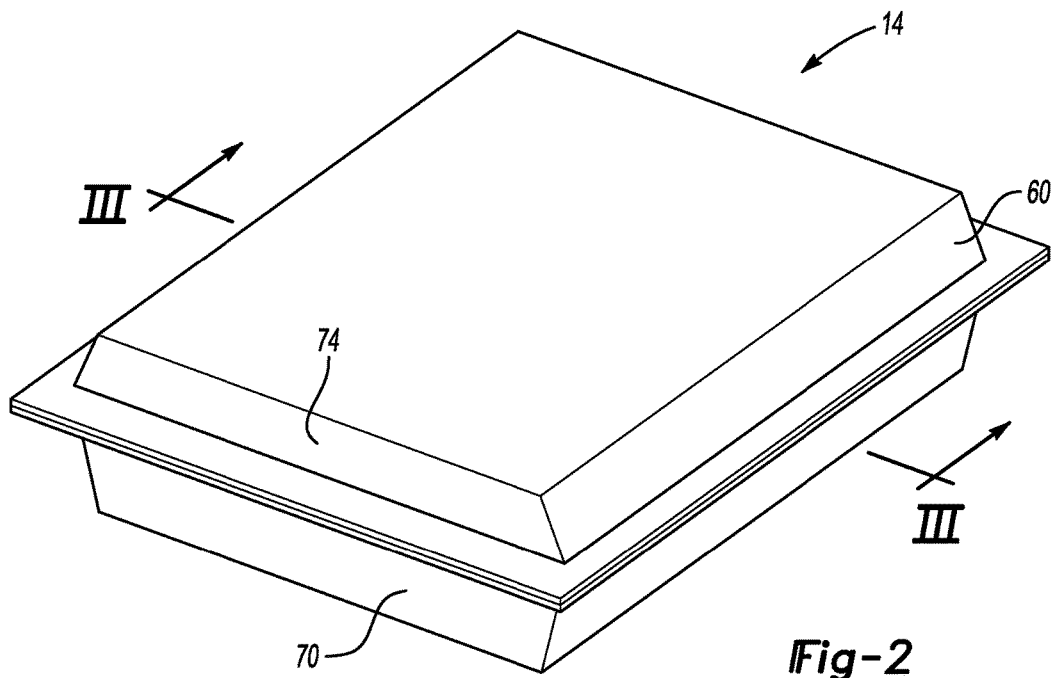
FIG. 2 illustrates a perspective view of a battery pack from the powertrain of FIG. 1.
Figure 3:
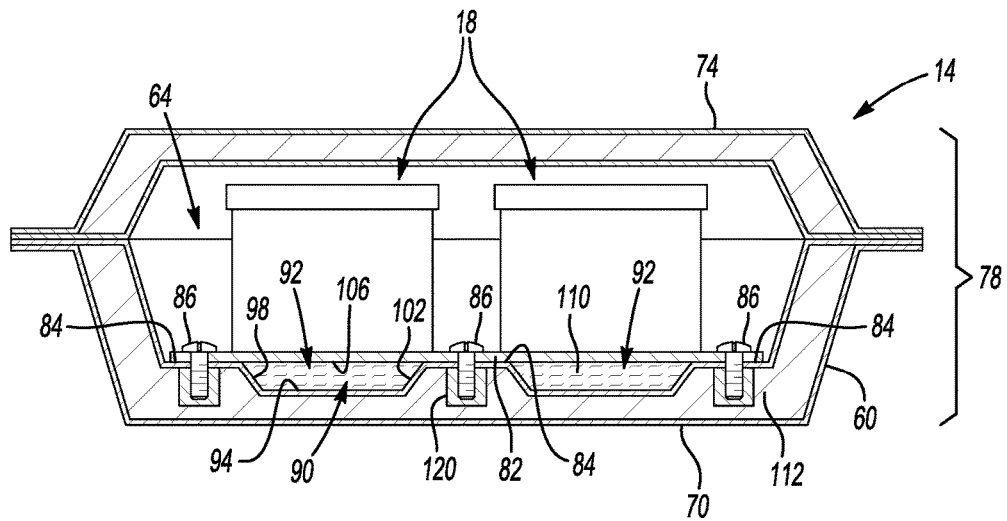
FIG. 3 illustrates a section taken along Line in FIG. 2.

Referring now to FIGS. 2 to 3 with continuing reference to FIG. 1, the battery pack 14 includes an enclosure 60 providing an interior area 64 that houses the battery arrays 18. The exemplary enclosure 60 houses two of the battery arrays 18 within the interior area 64. In other examples, the enclosure 60 houses more than two, or less than two, of the battery arrays 18 within the interior area 64.

The enclosure 60 includes a tray 70 and a lid 74. In this example, the tray 70 and the lid 74 each provide a portion of one of the sides 78 of the enclosure 60. In other examples, the sides 78 are provided entirely by the tray 70, entirely by the lid 74, or are provided by a separate structure from both the tray 70 and the lid 74.

Within the interior area 64, the battery arrays 18 rest upon a thermal exchange plate 82, which is supported upon support surfaces 84 provided by the tray 70. Mechanical fasteners 86 secure the thermal exchange plate 82 to the tray 70. Although described as the mechanical fasteners 86, other types of fastening devices could be used. The battery arrays 18 can be secured to the thermal exchange plate 82 utilizing other mechanical fasteners (not shown).

The thermal exchange plate 82 can be a metal or metal alloy. In one specific example, the thermal exchange plate is aluminum. The thermal exchange plate 82, and other examples, could be a material other than metals or metal alloys that is selected to promote thermal conduction. In one specific example, the thermal exchange plate is aluminum.

In some examples, a thermal interface material (TIM) could be positioned between the battery arrays 18 and the thermal exchange plate 82. The TIM can help to maintain thermal contact between the battery arrays 18 and the thermal exchange plate 82. The TIM may be a pre-cured sheet, a non-curing liquid, a curing liquid, a gel, or another type. The TIM may be silicone-based with conductive fillers, acrylic-based with conductive fillers, or another type.

In this exemplary embodiment, the tray 70 provides a portion of a coolant channel 90 associated with the battery arrays 18. The tray 70 includes a recessed area 92 to provide the coolant channel 90. The recessed area 92 has, in this example, a trapezoidal cross-sectional profile.

The recessed area 92 is recessed relative to the support surfaces 84 that interface with the thermal exchange plate 82. The recessed area 92 is provided by a bottom floor 94 and opposing sidewalls 98 and 102. The recessed area 92, in this example, does not extend to the sides 78 of the tray 70. In another example, the recessed area 92 does extend to the sides 78. Extending the recessed area 92 to the sides 78 can provide a coolant channel that interfaces with a bottom of the battery arrays 18, as well as a lateral side of the battery arrays 18.

In the assembled battery pack 14, the thermal exchange plate 82 covers the recessed area 92 to provide top surface 106 of the coolant channel 90. In particular, the thermal exchange plate 82 extends across the coolant channel 90 from the sidewall 98 to the sidewall 102.

Top and bottom, for purposes of this disclosure, are with reference to the orientation of the battery pack shown in FIG. 3. Other orientations for the battery pack 14 are possible, some of which could cause the top surface 106 to be a bottom surface of the coolant channel 90, and the bottom floor 94 to be a top surface of the channel. Thus, top and bottom should not be considered to limit the battery pack 14 to a particular orientation.

A coolant 110 can move through the coolant channel 90. In this example, the coolant 110 is a liquid coolant. In another example, the coolant 110 could be a gas. The support surfaces 84 could include a seal, such as an ethylene propylene diene monomer (EPDM) rubber seal, that is compatible with a coolant 110. The blocks the coolant 110 from moving between the support surfaces 84 and the thermal exchange plate 82. The seal could be a press-in-place seal, a carrier gasket seal, a foam seal, an RTV silicone seal, etc.

The coolant 110 exchanges thermal energy with the thermal exchange plate 82. In this example, the coolant 110 takes on thermal energy from the thermal exchange plate 82, which is generated during operation of the battery arrays 18. The coolant 110 cools the battery arrays 18 due to movement of the thermal energy from the battery arrays 18, through the thermal exchange plate 82, to the coolant 110 within the coolant channel 90.

The example coolant channel 90 extends beneath both of the battery arrays 18 within the interior area 64. Accordingly, the coolant 110 that is moved through the coolant channel 90 passes beneath both of the battery arrays 18 of the battery pack 14. In another example, the coolant channel 90 could be divided into separate channels. That is, for example, the coolant channel 90 could include a first channel associated with one of the battery arrays 18 and a separate, second channel associated with the other array.

Figure 4:
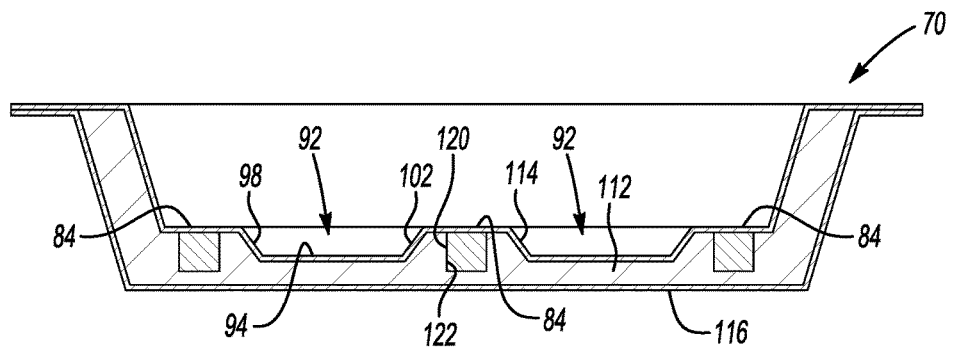
FIG. 4 illustrates a section of a composite structure of an enclosure from the battery pack of FIG. 2 taken along Line in FIG. 2 according to an exemplary embodiment.

Referring now to FIG. 4 with continuing reference to FIG. 3, the exemplary tray 70 is a composite structure of the enclosure 60. In particular, the tray 70 includes a core 112 sandwiched between a first outer layer 114 and a second outer layer 116. A least one insert 120 is disposed between the between the first outer layer 114 and the second outer layer 116 of the tray 70.

In this example, both the tray 70 and the lid 74 are a composite structures. In other examples, one of the tray or the lid is a composite structure, and the other of the tray or the lid is not a composite structure. In yet another example, another area of the enclosure 60 is a composite structure, such as a sidewall of the enclosure 60 that is separate from the tray 70 and the lid 74.

The core 112 can be foam. In this example, the foam is a closed-cell high-density foam. Other example materials suitable for use as the core 112 can include honeycomb structures, balsa wood, meta-aramid materials, such as those sold under the tradename Nomex®, etc. The core 112 can be produced by a variety of methods, which may depend on a material composition of the core 112. Exemplary methods can include extruding the core 112 and molding the core 112.

The first outer layer 114 and the second outer layer 116 are, in this example, a fiber reinforced plastic (FRP). The first outer layer 114 and the second outer layer 116 may include a woven material having directional specificity. A woven material is different than, for example, a chopped mat material having fibers that lack directional specificity.

Although the first outer layer 114 and the second outer layer 116 are depicted as a singular layer, additional layers could be utilized to, for example, increase a strength of the tray 70. Further, the material composition of the second outer layer 116 may differ from the material composition of the first outer layer 114. For example, the first outer layer 114 could have a material composition suitable for interfacing with the interior area 64 of the battery pack 14, and the second outer layer 116 could have a material composition suitable for interfacing with an outside environment surrounding the battery pack 14. The second outer layer 116 could be, for example, a high temperature resistant epoxy, such as epoxy sold under the trade/name of Duralco™ 4460.

In this example, the insert 120 is disposed within a slot 122 of the core 112. The insert 120, in this exemplary non-limiting embodiment, is a polymer-based material. In particular, the exemplary insert 120 is an ultra-high molecular weight (UHMW) polyethylene material. The insert 120 is a single, monolithic structure in this example. In another example, the insert 120 comprises a plurality of separate, individual inserts. In other examples, the insert 120 is a metal or metal alloy. The material and shape of the insert 120 can be selected to reduce or eliminate creep and to maintain a seal between the thermal exchange plate 82 and the tray 70.

In the assembled battery pack 14 of FIG. 3, the mechanical fasteners 86 extend through the first outer layer 114 to threadably engage with an area of the insert 120. The engagement of the mechanical fasteners 86 with the insert 120 clamps the thermal exchange plate 82 against the support surfaces 84 of the tray 70. The insert 120, in other examples, could be used to secure other battery components instead of, or in addition to, the thermal exchange plate 82.

In the cross-section through the coolant channel 90 shown in FIG. 3, the tray 70 provides a portion of a perimeter of the coolant channel 90, and the thermal exchange plate 82 provides the remaining portions of the perimeter of the coolant channel 90. The entire perimeter of the coolant channel 90 is thus provide by the tray 70 and the thermal exchange plate 82. In other examples, another structure, such as the insert 120 could be used to establish some part of the perimeter of the coolant channel 90.

Selected assembly steps of the battery pack 14 are shown in FIGS. 5A-6E. In FIGS. 5A and 6A, the exemplary core 112 is shown after receiving the insert 120.

After positioning the insert 120 within the core 112, the first outer layer 114 and the second outer layer 116 are positioned around the core 112 and the insert 120 to provide a composite structure as shown in FIGS. 5B and 6B. The core 112 and the insert 120 are sandwiched between the first outer layer 114 and the second outer layer 116. When assembled, the insert 120 is disposed along the sidewalls 98 and 102 of recessed area 92 such that the insert 120 is on opposing sides of the recessed Area 92. The insert 120 extends longitudinally along the sidewalls 98 and 102.

When viewed from above, the recessed area 92 has a "C" shape to track a footprint of the battery arrays 18 when the battery arrays 18 are positioned on the tray 70. Due to the "C" shape, coolant can flow along a path P within the coolant channel 90 beneath both of the battery arrays 18 of the battery pack 14.

The coolant channel 90 may have any of a number of possible configurations and is not limited to the "C" shape with a single primary flow path that is shown. Other exemplary configurations could include a serpentine flow path, a parallel flow path (with two or more separate channels) or some other type of configuration.

One exemplary process that can be utilized to sandwich the core 112 and the insert 120 between the first outer layer 114 and the second outer layer 116 is vacuum bagging. Of course, other processes could be used.

Figure 7:
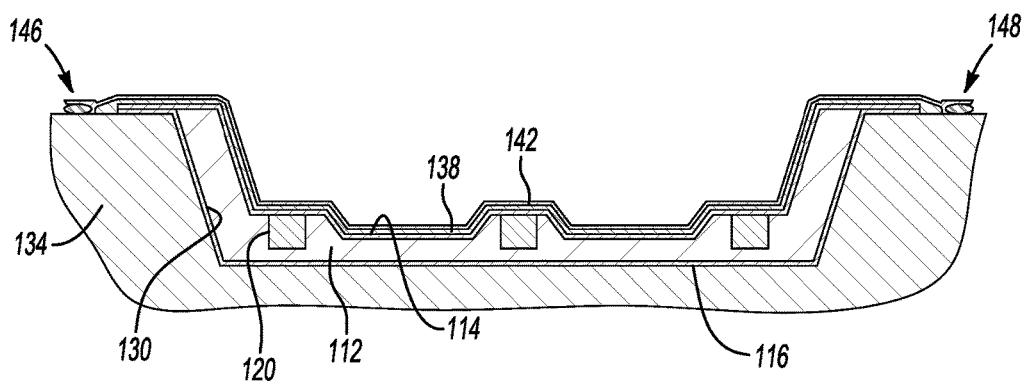
FIG. 7 illustrates a section view of the composite structure of FIG. 4 during assembly according to the exemplary embodiment.

As shown in FIG. 7, a vacuum bagging process can involve positioning the core 112, the insert 120, the first outer layer 114, and the second outer layer 116 within a cavity 130 of a mold 134. The first and second outer layers 114 and 116 can be reinforced fibers impregnated with a resin or wet layup.

A breather material 138 and a vacuum bag 142 are then positioned over the first outer layer 114 and sealed at outboard edges 146 and 148 to the mold 134. The vacuum bag 142 is stretchable.

The areas between the vacuum bag 142 and the mold 134 are then vacuumed to force the tray 70 to conform to the cavity 130. The first outer layer 114 and the second outer layer 116 then cure within the mold 134. After curing, the vacuum is released, and the tray 70 removed from the mold.

A mold release agent could be positioned between the mold 134 and the second outer layer 116 to facilitate releasing of the tray 70 from within the cavity 130 after curing. A material could be positioned within the mold to soak up resin during the vacuuming and to permit resin diffusion from the first and second outer layers 114 and 116.

A perforated material, such as peel-ply or nylon fabric, may be incorporated between the breather material 138 and the first outer layer 114 to facilitate removal of the breather material 138 and the vacuum bag 142 from the first outer layer 114 after curing.

In some examples, curing could take up to twelve hours. To reduce cure time, the tray 70 could be placed within an autoclave. Some other examples could include utilizing fast curing epoxies.

Referring now to FIGS. 5C and 6C, the tray 70 is then machined via, for example, a drilling process, to construct an inlet 150 and an outlet 154 through the tray 70 to the recessed area 92 that will provide the coolant channel 90. The inlet 150 and the outlet 154 can be used to communicate a coolant, such as a liquid coolant, to and from the coolant channel 90. For example, a liquid coolant heated within the coolant channel 90 can be moved through the outlet 154 to a heat exchanger to remove thermal energy, and then recirculated back to the coolant channel 90 through the inlet 150.

The thermal exchange plate 82 is then secured to the tray 70 as shown in FIGS. 5D and 6D. The securing involves torqueing the mechanical fasteners 86 that engage the tray 70 via the insert 120.

After securing the thermal exchange plate 82, the battery arrays 18 can then be positioned atop the thermal exchange plate 82 as shown in FIGS. 5E and 6E. The lid 74 can then be secured to the tray 70 to provide the enclosure of FIGS. 2 and 3.

Features of the disclosed examples can include an enclosure with a composite structure that is scalable to accommodate various sizes and numbers of battery arrays. The composite structure permits the use of multiple types of resin within a single enclosure.

Flexibility to use multiple types of resins can be advantageous. For example, as was described in connection with FIG. 3, a surface of the composite structure facing toward an interior of the battery pack can be formed from a type of resin more suitable for such an interior environment, whereas the outer layer facing outward from the enclosure can be constructed of another resin suitable for such an exterior environment.

The core of the composite structure can act as an insulator that reduces the effect of external heat sources on the battery arrays of the battery pack. Such heat sources can include heat from an exhaust of a vehicle incorporating the battery pack. Accordingly, more cooling capacity can be dedicated to the battery arrays and other components of the battery pack. Such focused cooling may permit downsizing of cooling system components, increased capability toward performance, or both. Further, the insulative effects of the core within the composite structure may reduce the need for external insulating parts, such as heat shields.

The composite structure, in some exemplary embodiments, has a higher strength to weight ratio per unit area when compared to enclosures made of steel, aluminum, etc.

Incorporating the coolant channels to be at least partially defined by the composite structure can reduce complexity and cost as separate coolant conduits are not necessarily required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
a composite structure of an enclosure that supports a battery component, the composite structure providing at least a portion of a coolant channel that carries a coolant, the composite structure including a core sandwiched between a first outer layer and a second outer layer, the first and second outer layers having a material composition different than a material composition of the core.

2. The battery assembly of claim 1, wherein the battery component is a thermal exchange plate providing another portion of the coolant channel.

3. The battery assembly of claim 2, wherein, at a cross-section through the coolant channel, the thermal exchange plate and the composite structure together provide an entire perimeter of the coolant channel.

4. The battery assembly of claim 1, further comprising an insert held within a core of the composite structure, the insert configured to receive a fastener that secures the battery component relative to the composite structure.

5. The battery assembly of claim 4, wherein the insert extends longitudinally along at least one side of the coolant channel.

6. The battery assembly of claim 1, wherein the core is a foam.

7. The battery assembly of claim 6, wherein the first outer layer and the second outer layer are a fiber reinforced plastic.

8. The battery assembly of claim 1, wherein the first outer layer directly contacts a liquid coolant within the coolant channel.

9. The battery assembly of claim 1, further comprising at least one support surface and at least one channel surface of the composite structure, the at least one support surface directly contacting the battery component, the at least one channel surface recessed relative to the at least one support surface to provide a recessed area for the coolant channel.

10. The battery assembly of claim 1, wherein the composite structure is a tray of the enclosure.

11. A battery cooling method, comprising:
exchanging thermal energy between a coolant and a thermal exchange plate as the coolant is communicated through a coolant channel that is at least partially established by a composite structure of an enclosure the composite structure comprises a core sandwiched between a first outer layer and a second outer layer; and
supporting at least one battery area upon the thermal exchange plate.

12. The battery cooling method of claim 11, further comprising supporting at least one battery array upon the thermal exchange plate.

13. The battery cooling method of claim 11, further comprising supporting the thermal exchange plate on at least one support surface of the composite structure, the coolant channel recessed from the at least one support surface.

14. The battery cooling method of claim 11, further comprising securing the thermal exchange plate relative to the composite structure by engaging a fastener with an insert held within a core of the composite structure.

15. The battery cooling method of claim 11, further comprising sandwiching a core between a first outer layer and a second outer layer to provide the composition enclosure, the first and second outer layers having a material composition different than a material composition of the core.

16. The battery cooling method of claim 15, further comprising sandwiching the core between the first and second outer layers using a vacuum bagging process.

17. The battery cooling method of claim 15, wherein the core is a foam.

18. A battery assembly, comprising:
a thermal exchange plate;
a battery array supported on the thermal exchange plate;
a composite structure of an enclosure, the composite structure including a core sandwiched between a first outer layer and a second outer layer, the first and second outer layers having a material composition different than a material composition of the core, the composite structure including at least one support surface and at least one channel surface, the at least one support surface directly contacting the thermal exchange plate, the at least one channel surface recessed relative to the at least one support surface to provide a recessed area, the thermal exchange plate and the recessed area of the composite structure together providing a coolant channel; and
an insert held within a core of the composite structure, the insert configured to receive a fastener that secures the thermal exchange plate relative to the composite structure.

19. The battery assembly of claim 18, wherein, at a cross-section through the coolant channel, the thermal exchange plate and the composite structure together provide an entire perimeter of the coolant channel.

20. The battery assembly of claim 18, wherein the first outer layer and the second outer layer are a fiber reinforced plastic and the core is foam, wherein the first outer layer directly contacts a liquid coolant within the coolant channel.

* * * * *